F. A. HART.

TYPE WRITING MACHINE.

APPLICATION FILED FEB. 24, 1917.

Reissued Apr. 10, 1917.

14,283.

2 SHEETS—SHEET 1.

Inventor:

Frederick A. Hart by B. B. Stickney

Atty

F. A. HART.

TYPE WRITING MACHINE.

APPLICATION FILED FEB. 24, 1917.

Reissued Apr. 10, 1917.

14,283

2 SHEETS—SHEET 2.

Inventor:
Frederick A. Hart
by R. B. Stickney
Atty

UNITED STATES PATENT OFFICE.

FREDERICK A. HART, OF NEWARK, NEW JERSEY, ASSIGNOR TO UNDERWOOD COMPUTING MACHINE COMPANY, OF NEW YORK, N. Y., A CORPORATION OF NEW YORK.

TYPE-WRITING MACHINE.

14,283. Specification of Reissued Letters Patent. Reissued Apr. 10, 1917.

Original No. 1,212,940, dated January 16, 1917, Serial No. 870,972, filed November 9, 1914. Application for reissue filed February 24, 1917. Serial No. 151,381.

*To all whom it may concern:*

Be it known that I, FREDERICK A. HART, a citizen of the United States, residing in Newark, in the county of Essex and State of New Jersey, have invented certain new and useful Improvements in Type-Writing Machines, of which the following is a specification.

This invention relates to a web or tally strip supporting and feeding mechanism adapted for use with typewriting machines.

An object of the invention is to provide improved means for feeding a tally strip or other web from a supply roll over the machine platen and onto a storage or winding roll, the web-feeding mechanism being operated by the line-spacing mechanism of the machine for feeding the tally strip a single line-space distance at each operation of the line-spacing mechanism whether the latter is set for single, double, or wider line spacing. Provision is also made for maintaining the line spacings of the web uniform regardless of the increasing diameter of the winding roll.

The invention further provides means for automatically advancing the tally strip a line-space distance each time a work-sheet is removed from the machine and replaced by a new sheet, so that a blank portion of the tally strip will be presented to receive the record of the first line written on the new work-sheet without requiring the operator to operate the line-spacing mechanism after the last line of a sheet has been written.

The tally strip mechanism may be mounted on the typewriter platen frame, and comprises a support for a supply roll from which the tally strip extends around the platen and to a pair of feed rolls, one of which is mounted on a drive shaft extending parallel with the platen and connected through suitable gearing to be rotated by the line-space lever. The tally strip is drawn forward over the platen by said rolls, and after passing between the rolls is wound on a winding spindle or mandrel to form a record roll. The winding spindle is driven by the said drive shaft through gearing comprising a slip connection, permitting the speed of the winding spindle to accommodate itself to the gradually increasing size of the storage roll. The winding spindle may at any time be withdrawn in a longitudinal direction from the record roll, leaving the latter free to be severed, by means of a tearing blade, from the remainder of the web, and removed from the machine. Tension springs bearing on the supply roll serve not only to prevent slack in the tally strip, but also to prevent the tally strip from being fed forward by the platen more rapidly than it is fed by the tally strip feed rolls.

The usual key for throwing the main feed rolls off the platen is connected through a pawl-and-ratchet mechanism, to operate the drive shaft for the tally strip rolls, and advance the tally strip whenever the key is operated to permit a completed work-sheet to be removed and replaced by a new one.

Other features and advantages will hereinafter appear.

In the accompanying drawings.

Figure 1:
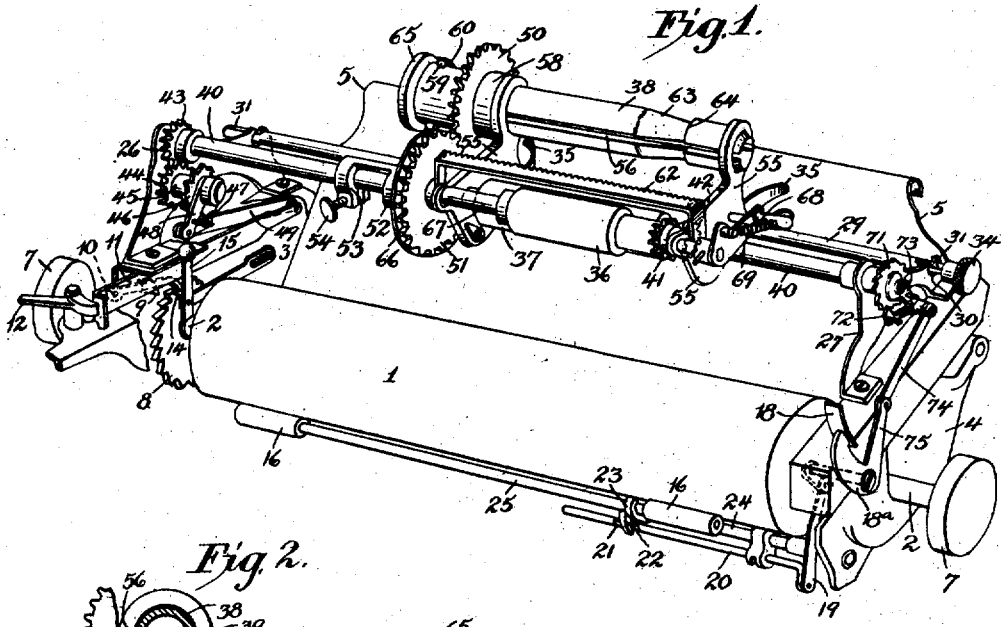
Figure 1 is a perspective view of the invention applied to an Underwood typewriting machine.
Figure 2:
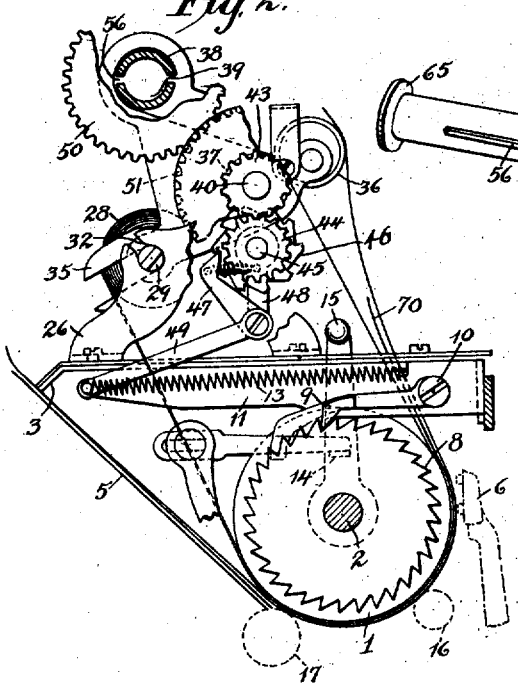
Fig. 2 is an end elevation, viewed from the left-hand end of the platen, parts being broken away and parts shown in section.

The typewriter platen 1 is mounted on an axle 2 journaled in the platen frame, comprising ends 3 and 4 connected by an inclined paper table 5 at the intake side of the platen. Types 6, operated by the usual mechanism, strike against the work-sheet at the front face of the platen. The platen may be rotated by hand wheels 7 or by the usual line-space mechanism comprising a line-space ratchet wheel 8 fixed to the platen axle and driven by a pawl 9 pivoted at 10 to the plunger or driver 11, actuated by the line-space lever 12. The driver and pawl are returned by a spring 13 connected at its ends to the driver and platen frame respectively.

The pawl 9 is held off the ratchet wheel during the initial movement of the driver 11 by means of a ledge 14 carried by an adjusting lever 15, which may be set to permit the pawl 9 to engage the ratchet wheel earlier or later in the throw of the plunger 11 and thereby cause the ratchet wheel to be rotated one, two, or more line-spaces, at each peration of the line-space lever.

Figure 5:
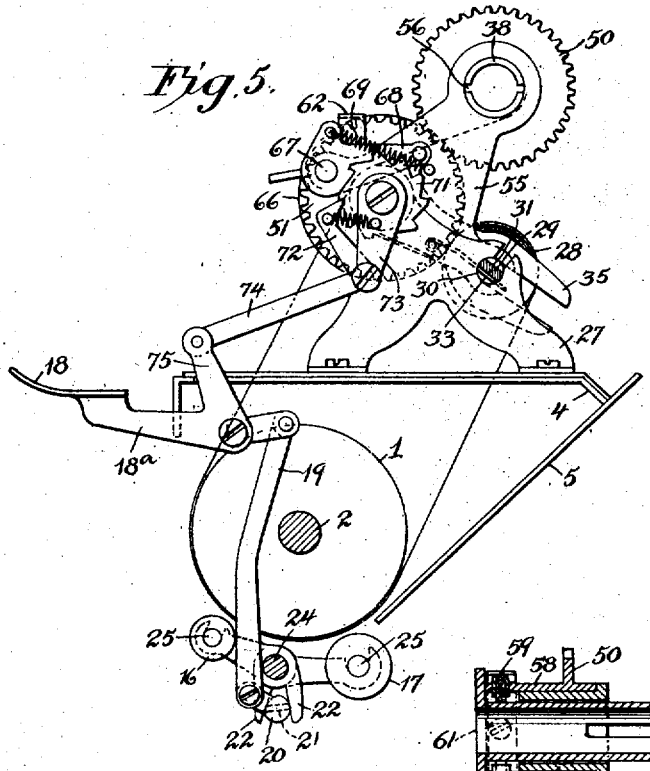
Fig. 5 is an elevation view as seen from the right-hand end of the platen.

Front and rear feed rolls 16 and 17 which bear against the under face of the platen for feeding the work-sheets forwardly, may be thrown off the platen by means of a key 18, on a lever 18[a], connected through a link 19 to a rock shaft 20, having cams or flats 21 to engage lugs 22 on levers 23, fulcrumed on a rod 24, said levers supporting shafts 25 on which the feed rolls 16 and 17 are mounted. By depressing the key 18, the feed rolls are thrown off the platen, as indicated in Fig. 5. The parts thus far described are those common to the commercial Underwood typewriting machine.

The tally strip mechanism is removably mounted on the platen frame by means of end brackets 26 and 27, mounted respectively on the frame ends 3 and 4. The tally strip supply roll 28 is mounted on a rod 29 extending parallel with the platen, and is removably mounted on the brackets 26 and 27, the latter provided with openings 30 to receive and form bearings for the ends of said rod. The rod has portions cut away to provide necks 31 to enter the restricted portions 32 of the openings 30, and the rod is held against accidental displacement by a spring 33 which, as shown in Fig. 5, bears against the flat face of a neck 31, and holds the rod 29 against rotary movement into a position to pass through the restricted portions 32 of the openings. The rod, however, may be readily removed by first rotating it through a quarter turn by means of the knurled thumb piece 34. The supply roll 28 is held against longitudinal displacement by means of a pair of leaf springs 35 which further serve as tensioning means for the tally strip, as will more fully appear hereinafter.

The tally strip extends from the supply roll 28 downwardly around the platen and up to and between a pair of feed rolls 36 and 37, which form a feeding couple to draw the web forward over the platen. From the feeding couple the strip extends rearwardly to a winding spindle 38 on which it is wound to form a record roll 39.

The rear feed roll 37 is mounted on a drive shaft 40, which is journaled near its ends in the brackets 26 and 27. Intermeshing gears 41 and 42, connected respectively to the rolls 36 and 37, cause both said rolls to be positively driven at the same peripheral speed when the drive shaft 40 is rotated. These feed rolls are provided with a facing of rubber or other suitable compressible friction material. The drive shaft 40 may be rotated to feed the tally strip forwardly, by means of a gear train connecting said shaft to the line-space mechanism. Said train comprises a pinion 43 on the shaft 40, and running in mesh with a pinion 44 on a stud shaft 45 mounted in the bracket 26. Connected to rotate with the pinion 44 is a ratchet wheel 46 driven by a pawl 47 pivoted to a rock arm 48 journaled on the shaft 45. Said rock arm 48 is connected through a link 49 to the driver 11, so that each time the line-space lever 12 is operated, the ratchet wheel 46 is rotated the angular distance between two adjacent teeth thereon, said rotation being imparted to the tally strip feed rolls through the gearing just described, and the tally strip thus fed forwardly a line-space distance. It will be noted that the extent of rotation of the ratchet wheel 46 is the same for each line-space operation, regardless of whether the lever 15 is set for single, double or wider line-spacing.

The tally strip may pass around the platen at a position between the main feed rolls 16 and 17, so that the pressure of said rolls will not be applied on the tally strip. The platen has a tendency to feed the tally strip forwardly faster than it is fed by the feeding couple 36, 37, particularly when the line-spacing mechanism is set for double or triple line-spacing. The tension springs 35, however, exert a braking action on the supply roll 28 sufficient to take the tally strip out of the control of the platen. In other words, the pull of the platen on the tally strip is insufficient to rotate the roll 28 against the holding power of the springs 35, so that the web is only fed forward at the peripheral speed of the rolls 36, 37.

Figure 3:
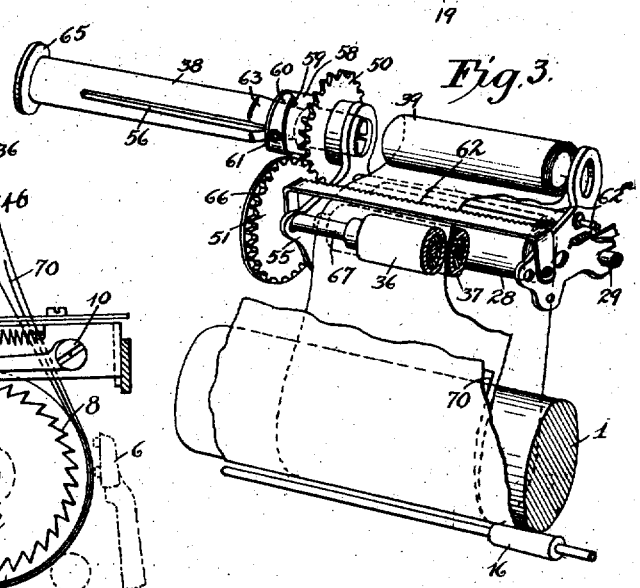
Fig. 3 is a sectional perspective view showing the tally strip rolls, the winding spindle being shown withdrawn from the storage roll.

After passing between the feed rolls 36 and 37, the tally strip is wound onto the receiving spindle or mandrel 38 driven from the shaft 40 through a train of gears 50, 51. The gear 51 may be connected to the drive shaft 40 through the intermediary of a sleeve 52 loose on the shaft and provided with an extension 53 forming a pair of clamping jaws surrounding the shaft and said jaws may be caused to grip said shaft by means of a set screw 54, thereby connecting the gear 51 to rotate with said shaft. The feed rolls 36 and 37 and the spindle 38 are mounted in a frame comprising end plates or brackets 55 rigidly connected as by means of a bar 62 which serves as a tearing blade, and a rod 62[a] (Fig. 3). Said frame is slidably mounted on the drive shaft 40 and the rod 29, so that by loosening the set screw 54, the frame may be adjusted to bring the tally strip and its supporting rolls to any position along the platen, and then secured in adjusted position by setting up the screw 54.

Figure 7:
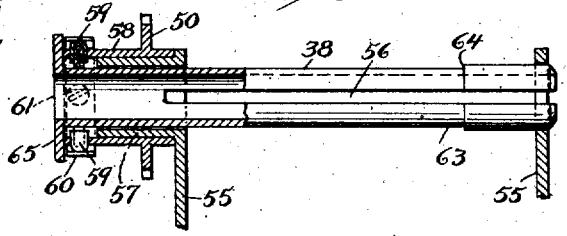
Fig. 7 is a part sectional view of the winding spindle and showing the slip connection between said spindle and its driving pinion.

The mandrel 38 is preferably tubular, and is split by means of oppositely disposed slots 56 extending longitudinally thereof, said slots providing means for securing the end of the tally strip to the mandrel, and also permitting the mandrel to be withdrawn longitudinally from the record roll as indicated in Fig. 3. By reference to Fig. 7, it will be seen that the left-hand bracket 55 is formed with a tubular extension 57, in which the mandrel 38 is both slidably and rotatably supported. Said extension also forms a bearing for a hub 58 on the gear wheel 50.

Figure 4:
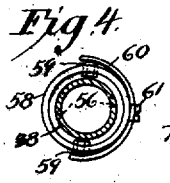
Fig. 4 is a sectional detail showing the slip connections between the winding spindle and its driving means.

A slip connection between the gear 50 and the mandrel 38 is provided by means of hollow bearing blocks 59 containing leather or other suitable friction material, said blocks mounted in openings in the hub 58 and placed under a yielding radial pressure causing the frictional material to bear on the mandrel 38. The pressure is produced by a U-shaped leaf spring 60 (Fig. 4), secured by a screw 61 to the hub 58, and having its ends bearing on the blocks 59. The mandrel 38 is of sufficient size to always wind the tally strip as fast as it is fed forward by the feed rolls 36, 37, and the slip connection just described, permits the speed of the mandrel to be reduced to compensate for the increasing size of the record roll. In other words, the peripheral speed of the record roll on the mandrel is always the same as that of the feed rolls 36, 37.

To connect the end of the tally strip to the mandrel 38, the latter may be turned to bring the slots 56 in alinement with the forward end of the tally strip as the latter is advanced from the feed rolls 36, 37. Said end is then introduced into the slot 56 and the mandrel rotated a short distance by hand. When it is desired to remove the record roll that has been wound on the mandrel, the latter is withdrawn longitudinally to the position shown in Fig. 3, thus entirely disconnecting it from the roll which may then be severed from the remaining portion of the strip by means of the tearing blade 62. The mandrel 38 has a tapered or reduced portion 63 which provides a shoulder 64, the latter serving to prevent the mandrel from being accidentally withdrawn entirely from its support, because the shoulder 64 is brought up against the blocks 59 when the mandrel reaches the Fig. 3 position.

Figure 6:
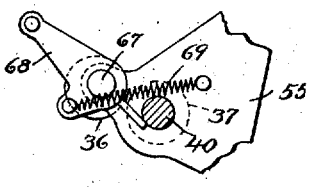
Fig. 6 is a detail view showing the eccentric mounting for one of the feed rolls.

A flange 65 on the mandrel serves as a handle for withdrawing the mandrel and also limits the movement of the mandrel to the right by being brought up against the hub 58, in which position, the right-hand end of the mandrel has a bearing in the right-hand bracket 55. The gear 50 is held against endwise displacement by the left-hand bracket 55 bearing against one end of the hub 58, and by a disk 66 which lies against the left-hand face of the gear wheel 51, said disk extending to the outer periphery formed by the teeth of the gear 51, so that it always overlaps the teeth of the gear 50. The disk 66 may be formed integral with the sleeve 52 and form a connecting means between said sleeve and the gear 51. The tally strip feed rolls 36 and 37 may be separated to permit the tally strip to be readily inserted or removed by the following arrangement:

The roll 36 is loosely mounted on a shaft 67 having eccentric or off-set ends journaled in the brackets 55. To the right-hand end of the shaft 67 is secured a hand lever 68, which may be thrown forwardly to the Fig. 6 position, thus rotating the shaft 67 on its eccentric bearings, and separating the roll 36 from the roll 37. The eccentric movement of the shaft 67 is insufficient to disconnect the gears 41, 42, which preferably remain permanently in mesh. When the lever 68 is thrown rearwardly, the roll 36 is thrown into engagement with the roll 37. A spring 69 serves to hold the lever 68 in either position and when the rolls are together, provides suitable pressure between the contact surfaces of the rolls.

In practice, the tally strip is generally used to receive the carbon record of items printed on the original bills or work-sheets, which are placed on the platen in position to overlap the tally strip, a carbon strip 70 being interposed between the original and the tally strip. The carbon 70 is usually a continuous strip fed with the tally strip from the supply roll 28, but it need not be passed between the feed rolls 36, 37 as it is carried along by the tally strip and overlying work-sheet. The reason for providing these overlapping portions upon the original bills is to enable the rolls to press the bills against the platen to travel therewith, at a greater speed than that of the tally strip which intervenes between the original bill and the platen. The rolls referred to must not therefore press the outer sheet against the slowly moving tally strip. The control of a wide sheet by means of rolls engaging its overlapping portions is disclosed in the patents to Kunath 817,924, and McCormack 975,264.

Figure 8:
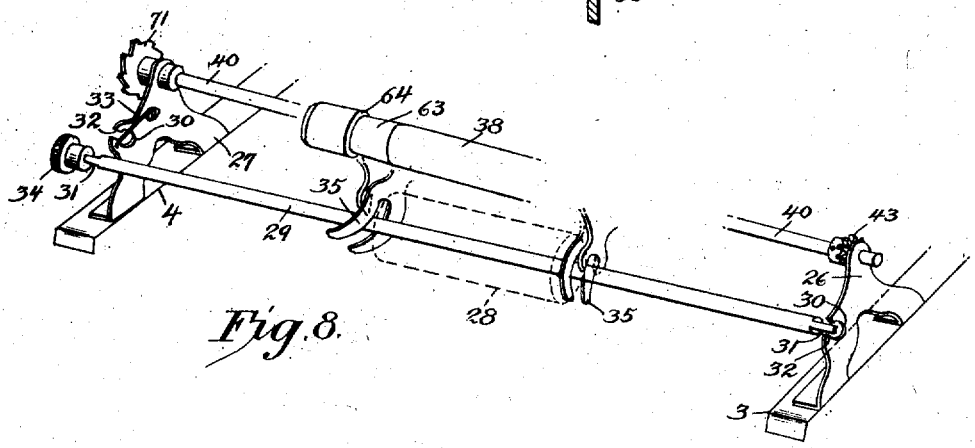
Fig. 8 is a rear perspective view showing the removable spindle on which the supply roll is mounted.

In order to place the supply roll 28 in position, the rod 29 is removed and the roll 28 comprising the tally strip and carbon strip, slipped endwise thereon and then replaced (see Fig. 8) with the roll between the tension springs 35. The free ends of the strips are then carried downwardly around the platen, and the end of the tally strip drawn upwardly and fed between the separated feed rolls 36, 37, and connected to the mandrel 38 as before described. The lever 68 is then thrown backwardly, to grip the tally strip between the feed rolls, so that the tally strip and its carbon may be fed forward as the line-space lever is operated to feed forward the original work-sheet which is placed on the machine when the tally strip is in position.

When the entries on the work-sheet have been completed, the key 18 is depressed to throw the main feed rolls off and permit the sheet to be removed and a new one substituted. In order that the tally strip may be advanced when the last line on an original sheet has been written, and before the succeeding sheet has been written upon, mechanism is provided for operating the feed rolls 36, 37, by the key 18. Such mechanism comprises a ratchet wheel 71 fixed to the right-hand end of the drive shaft 40 and operated by a pawl 72 pivoted on a rock arm 73 journaled on the drive shaft 40, said rock arm connected through a link 74 to an arm 75 of the key lever 18[a], so that whenever the key 18 is depressed, the pawl 72 is operated to rotate the drive shaft and feed the tally strip forward.

Although the invention has been particularly described as adapted for use in connection with a tally strip, it will be understood that it may also be adapted for use with continuous strips or webs designed for other purposes.

Variations may be resorted to within the scope of the invention, and portions of the improvements may be used without others.

Having thus described my invention, I claim:

1. The combination with a platen and a line-space mechanism for rotating the platen, said mechanism comprising adjusting means for varying the extent the platen is rotated by an operation of the line-space mechanism, of means for feeding a strip or web over the rotatable printing surface of the platen, and means to prevent the web from being fed by the platen, said web-feeding means operable by said line-space mechanism to feed the web forwardly the same distance at each operation of the line-space mechanism regardless of the distance the platen is rotated by said operation.

2. The combination with a platen and line-space mechanism for rotating the platen, said mechanism comprising adjusting means for regulating the distance the platen is rotated at each line-space operation, of means for feeding a web or strip over the platen, comprising feed rolls between which the web extends after passing over the platen, gearing between said feed rolls and the line-space mechanism operable to rotate the feed rolls to advance the web the same extent at each line-space operation independently of the extent of rotation of the platen, and means at the introductory side of the platen for placing tension on said web sufficient to prevent it from being fed forwardly by the platen, so that the web is advanced at the peripheral speed of the said feed rolls.

3. In a typewriting machine, the combination with a roller platen and line-space mechanism for rotating the platen, of means for feeding a web or strip over the platen, said means comprising a web-feeding device to draw the web over the platen, a tension device for applying tension to the web at the introductory side of the platen sufficient to prevent the web from being drawn forwardly by the platen as the latter rotates, and means operated by the line-space mechanism to actuate said web-feeding device.

4. In a typewriting machine, the combination with a platen and a line-space mechanism for imparting step-by-step rotations to the platen, of a tally strip mechanism comprising a support for a supply roll, a feeding roll couple to which the web extends from the supply roll after passing around the platen, a winding spool or spindle on which the web is wound after passing between the rolls of said couple, a gear train between said couple and the line-space mechanism, for driving said couple at each line-space operation, gearing for rotating the winding spindle when said couple is driven, to wind the strip as it is advanced by said couple, said gearing comprising a slip connection, and a tension device applied to said supply roll to retard its rotation and place tension on the web sufficient to prevent it from being drawn forwardly with the platen at a greater speed than it is advanced by said couple.

5. The combination with a rotary platen, platen feed rolls for feeding a work-sheet over the platen, and means for rotating the platen, of means for feeding a web or strip which passes around the platen between the platen and work-sheet, said means comprising a winding spool to receive the web as it is fed over the platen, means to rotate said winding spool, and means at the introductory side of the platen to place tension on said web sufficient to prevent the web from being advanced by the platen.

6. The combination with a platen frame and a platen, of tally strip mechanism comprising a drive shaft extending parallel with the platen, means forming a support for a tally strip supply roll, a winding spindle, said support and winding spindle adjustable along said drive shaft to bring the tally strip to different positions longitudinally of the platen, means for feeding the tally strip over the platen and winding it on said winding spindle, and means for placing tension on the tally strip between the supply roll and the platen sufficient to prevent said strip from being carried forwardly by the rotation of the platen.

7. In a typewriting machine, the combination with a platen and a platen frame, of brackets secured to the platen frame ends, said brackets provided with recesses having restricted entrances, each recess forming a journal bearing, a rod forming a support for a tally strip roll, and having flattened portions movable through said entrances, to permit said rod to be placed in its bearings, said rod, when rotated in its bearings to present said flattened portions across said entrances, being held against removal, and a spring to bear against a flattened or reduced portion of the rod to hold it against accidental rotation into a position to be removed.

8. In a typewriting machine, the combination with a platen and a line-space mechanism for rotating the platen, of tally strip mechanism comprising means to support a tally strip extending around the platen over the rotary printing surface thereof, and feed said strip forwardly step by step as the line-space mechanism is operated, means for controlling the advance of the tally strip line by line independently of the distance through which the platen is rotated at each operation of its line-space mechanism, and means operated automatically to advance the tally strip each time the machine is manipulated to remove a work-sheet and replace it by a new work-sheet.

9. In a typewriting machine, the combination with a platen, line-space mechanism for imparting step-by-step rotations to the platen, platen feed rolls to feed work-sheets over the platen, and a key for throwing the feed rolls off the platen to permit the removal of a work-sheet, of means for feeding a tally strip around the platen between the latter and the work-sheets, connections between said means and said key for operating said means and advancing the tally strip when the key is operated, connections between the line-space mechanism and the tally strip feeding means for operating the latter when the line-space mechanism is operated, and means effective at the rotation of the platen for controlling the advance of the tally strip independently of the distance through which the platen is rotated, and independently of the work-sheet overlying the tally strip and being carried around by the platen; said feed rolls mounted to run only upon portions of the platen not occupied by the tally strip.

10. In a typewriting machine, the combination with a platen, line-space mechanism for imparting step-by-step rotations to the platen, platen feed rolls to feed work-sheets over the platen, and a key for throwing the feed rolls off the platen to permit the removal of a work-sheet, of means for feeding a tally strip, connections between said means and said key for operating said means and advancing the tally strip when the key is operated, connections between the line-space mechanism and the tally strip feeding means for operating the latter when the line-space mechanism is operated, said tally strip positioned to extend between the platen and the work-sheets thereon, and a tension device to place tension on the tally strip at the introductory side of the platen, said tension being sufficient to prevent the tally strip from being fed forwardly by the platen and work-sheets.

11. The combination with a roller platen and platen feed rolls for feeding a work-sheet over the platen, of a key connected to said feed rolls for throwing them off the platen, means to support a tally strip in position to extend around the platen between the latter and said work-sheet, to be fed over the platen, said tally strip-supporting means adjustable in a direction parallel with the platen axis to bring the tally strip to different positions along the platen and overlying work-sheet, tally strip feeding mechanism, means to prevent the tally strip from being drawn forward by the platen, and gearing between the said key and tally strip feeding mechanism for operating the latter when said key is operated.

12. The combination with a roller platen and platen feed rolls thereon for feeding work-pieces over the platen, of a line-space mechanism located at one end of the platen for rotating the platen, a key at the opposite end of the platen for throwing the said feed rolls off the platen, a drive shaft extending parallel with and substantially co-extensive longitudinally with the platen, driving connections between the line-space mechanism and the adjacent end of the drive shaft for rotating the drive shaft by power applied at said end of the drive shaft when the line-space mechanism is operated, connections between said key and the adjacent end of the drive shaft for rotating the drive shaft by power applied at said last-mentioned end thereof when the key is operated, and means operated by the drive shaft for feeding a tally strip.

13. The combination with a roller platen and platen feed rolls thereon for feeding work-pieces over the platen, of a line-space mechanism located at one end of the platen for rotating the platen, a key at the opposite end of the platen for throwing the said feed rolls off the platen, a drive shaft extending parallel with the platen, from one end of the platen to the other, driving connections between the line-space mechanism and the adjacent end of the drive shaft for rotating the drive shaft by power applied thereto at said adjacent end thereof when the line-space mechanism is operated, connections between said shaft and said key for rotating the drive shaft by power applied thereto at the end thereof adjacent the key when the latter is operated, means to support a tally strip in position to be fed over the platen, said support adjustable along said drive shaft to bring the tally strip to any desired position longitudinally of the platen, and means operated by said drive shaft for feeding the tally strip forwardly over the platen.

14. In mechanism for winding a strip or web, the combination with a winding spindle or mandrel provided with a longitudinal slot or opening to receive and form a holding means for the end of the web or strip wound thereon, of a support in which said mandrel is journaled, said mandrel movable longitudinally in said support to withdraw it from the roll formed by winding said strip thereon, and thereby permitting the roll to be removed bodily from the mandrel.

15. In a tally strip mechanism, the combination with a feeding roll couple, of a winding spindle or mandrel on which the tally strip is wound after being fed forwardly by said couple, and a gear train connecting said couple and said mandrel for rotating the latter at a speed sufficient to prevent slack in the strip between the said couple and mandrel, said gear train comprising a slip connection permitting the speed of the winding spindle to accommodate itself to the speed at which the web is fed forwardly by said couple.

16. In a tally strip mechanism, the combination with feed rolls, of means to drive said feed rolls, a strip or web between said rolls, a winding spindle on which said web is wound as it is fed between said rolls, driving connections between said feed rolls and said spindle comprising a gear connected to one of said feed rolls, an intermeshing gear having a hub surrounding said spindle, friction bearing blocks mounted in said hub, and a spring holding said bearing blocks against the said spindle and thereby providing a slip driving connection between the spindle and said feed rolls.

17. The combination with a platen and line-space mechanism for rotating the platen, said mechanism comprising adjusting means for regulating the distance the platen is rotated at each line-space operation, of means for feeding a web or strip over the platen comprising feed rolls between which the web extends after passing over the platen, and gearing between said feed rolls and the line-space mechanism operable to rotate the feed rolls to advance the web the same extent at each line-space operation independently of the extent of rotation of the platen.

18. In a typewriting machine, the combination with a revoluble platen and platen feed rolls for feeding work-pieces over the platen, of means to support a supply roll in position to permit a strip or web to extend from said roll around the platen and past the printing line, a feeding roll couple beyond the writing line and between the rolls of which the web extends, a winding spindle or spool on which the web, after passing said feeding roll couple, is wound and forms a winding roll, mechanism to drive said couple and said winding spool and cause said couple to draw the web from the supply roll around the platen, said winding spindle being rotated at a speed sufficient to prevent slack in the web between the said spindle and the feeding roll couple, the means for driving the winding spindle comprising a slip connection to permit the speed of the winding roll to adjust itself to that of the feeding roll couple and prevent excessive strain on the web, and means for placing a holding tension on the supply roll sufficient to prevent the web from being drawn therefrom by the platen and its feed rolls, and piled between the platen and said feeding roll couple.

19. In a typewriting machine, the combination with a revoluble platen, platen feed rolls for feeding work-pieces over the platen, and line-space mechanism for imparting step-by-step rotations to the platen, of means to support a tally strip supply roll, a tally strip feeding roll couple for advancing a tally strip extending from the supply roll around the platen to said couple, an auxiliary line-space mechanism operated by the platen line-space mechanism and connected to said feeding roll couple for driving the latter and advancing the tally strip step by step as the line-space mechanisms are operated, a winding spindle on which the strip is wound after leaving the feeding roll couple, a gear train to drive said spindle when the said couple is driven, said gear train comprising a friction slip connection to regulate the tension of the strip as it is wound on said spindle and permitting automatic adjustment of the speed of the spindle relatively to that of the feeding roll couple, and retarding means for the strip at the introductory side of the platen for preventing the strip from being drawn from the supply roll except by a force greater than that exerted thereon by the platen and its feed rolls, whereby the platen and the platen feed rolls are prevented from advancing the strip and piling it between the platen and the feeding roll couple, the peripheral advance of the platen at each line-space operation being greater than that of the feeding roll couple.

20. In a typewriting machine, the combination with a platen frame and a revoluble platen journaled therein, of a drive shaft parallel with the platen and supported on the platen frame, tally strip mechanism comprising a supporting frame adjustable along said drive shaft for adjusting a tally strip to different positions along the platen, a tally strip supply roll adjustable with said frame and from which the tally strip extends around the platen, a winding spindle carried by said supporting frame and on which the tally strip is wound after passing around the platen, driving connections between said drive shaft and spindle for rotating the latter, line-space mechanism for rotating the platen, and gearing between the line-space mechanism and said drive shaft for driving the latter when the line-space mechanism is operated.

21. In a typewriting machine, the combination with a platen frame and a revoluble platen journaled therein, of a drive shaft parallel with the platen and supported on the platen frame, tally strip mechanism comprising a supporting frame adjustable along said drive shaft for adjusting a tally strip to different positions along the platen, a tally strip supply roll adjustable with said frame and from which the tally strip extends around the platen, a winding spindle carried by said supporting frame and on which the tally strip is wound after passing around the platen, driving connections between said drive shaft and spindle for rotating the latter, line-space mechanism for rotating the platen, gearing between the line-space mechanism and said drive shaft for driving the latter when the line-space mechanism is operated, platen feed rolls, a key for throwing said feed rolls off the platen, and connections between said key and said drive shaft for rotating the latter when said key is operated.

22. The combination with a platen frame and platen, of supporting brackets mounted on the platen frame ends, a drive shaft extending parallel with the platen and journaled in said brackets, a tally strip supporting frame, a supporting rod for a tally strip supply roll, said rod mounted in said brackets, a feeding roll couple mounted in said tally strip frame, and driving connections between said drive shaft and said couple for driving the latter and thereby feeding over the platen a tally strip extending from said supply roll around the platen to said couple, said tally strip frame adjustable longitudinally of the platen to adjust the tally strip to different positions along the platen.

23. The combination with a platen frame and platen, of supporting brackets mounted on the platen frame ends, a drive shaft extending parallel with the platen and journaled in said brackets, a tally strip supporting frame, a supporting rod for a tally strip supply roll, said rod mounted in said brackets, a feeding roll couple mounted in said tally strip frame, driving connections between said drive shaft and said couple for driving the latter and thereby feeding over the platen a tally strip extending from said supply roll around the platen to said couple, said tally strip frame adjustable longitudinally of the platen to adjust the tally strip to different positions along the platen, and leaf-springs carried by the tally strip frame and bearing against the ends of the supply roll to hold the latter against longitudinal displacement and cause it to be adjusted with the tally strip and frame, said springs forming a brake for the supply roll and holding the latter with sufficient power to prevent the tally strip from being fed forwardly by the platen faster than it is drawn forwardly by said couple.

24. The combination with a platen frame and a platen, of brackets mounted on the platen frame ends, a drive shaft extending parallel with the platen and journaled in said brackets, a supporting rod for a supply roll, said rod mounted in said brackets and extending parallel with the platen, a tally strip frame supported on and adjustable along said drive shaft and said rod to adjust a tally strip to different positions along the platen, a feeding roll couple mounted in said tally strip frame, means for driving said drive shaft, gearing between said drive shaft and feeding roll couple for driving said couple when the drive shaft is rotated and thereby advancing over the platen the tally strip which extends from the supply roll around the platen to said couple, a winding spindle, gearing between the drive shaft and said winding spindle for rotating the latter and winding the tally strip thereon as it is advanced by the feeding roll couple, and leaf-springs carried by the tally strip frame and bearing against ends of the supply roll to cause the latter to be carried with the tally strip frame when the latter is adjusted, said springs also retarding the rotation of the supply roll and placing tension on the tally strip sufficient to prevent it from being drawn forwardly by the platen and piling up between the platen and said feeding roll couple.

25. In a tally strip mechanism, the combination with a drive shaft, of a feeding roll couple comprising a roll connected to said shaft to rotate therewith and a second roll, an eccentrically mounted supporting shaft on which said second roll is journaled, a winding spindle to receive a strip fed between said rolls, a lever connected to rotate said eccentric shaft into and out of position to separate said rolls, said lever having a limited movement in both directions, a spring to hold said lever in either position, intermeshing pinions carried by said rolls and remaining in mesh while said rolls are separated, and gearing between the winding spindle and drive shaft for rotating said spindle from the drive shaft.

26. In a typewriting machine and tally-strip mechanism therefor, the combination with a platen, of a supply roll from which a tally strip or web may extend around the platen past the printing line, a winding spindle on which the web is wound in a roll as it is fed beyond the printing line, and a frame in which the supply roll and winding spindle are mounted, said frame being mounted for adjustment lengthwise of the platen to adjust the position of the tally strip along the platen.

27. In a typewriting machine, the combination with a rotatable platen, of line-spacing mechanism to rotate the platen and feed a work-sheet thereover, web-feeding mechanism, means operated by the line-spacing mechanism to drive said web-feeding mechanism, and thereby advance a web step by step, a winding spool or spindle on which the web is wound as it is advanced by said web-feeding mechanism, means forming a driving connection between said web-feeding mechanism and winding spool including a slip connection permitting the speed of the winding spool to accommodate itself to the speed at which the web is advanced by its feeding means, said web being supported and guided over the platen so that the web and the work-sheet on the platen may be held against the platen in superposed relation along the printing line, and means at the introductory side of the platen for placing tension on the web, and thereby taking it out of the direct control of the platen, permitting the work-sheet on the platen to be fed independently of or at a different speed from that of said web.

28. In a typewriting machine, the combination with a platen frame and a revoluble platen journaled therein, of a drive shaft parallel with the platen and supported on the platen frame, tally-strip mechanism comprising a supporting frame adjustable along said drive shaft for adjusting the tally strip to different positions along the platen, a tally-strip supply roll adjustable with said frame and from which the tally strip extends around the platen, a winding spindle carried by said supporting frame and on which the tally strip is wound after passing around the platen, driving connections between said drive shaft and spindle for rotating the latter, and means to rotate said drive shaft.

29. In a typewriting machine, the combination with a platen carriage and a platen thereon, of tally-strip mechanism comprising a frame, a tally-strip supply roll and a tally-strip winding spindle both mounted on said frame in position to support a tally strip extending from the supply roll around the platen past the printing line to the winding spindle, means for supporting said frame on the platen carriage, said frame adjustable lengthwise of the platen for adjusting the tally strip to different positions along the printing line, a drive shaft extending lengthwise of the platen, and means forming a driving connection from said shaft to the winding spindle and adjustable with said spindle lengthwise of the platen.

30. In a typewriting machine, the combination with a platen frame and a revoluble platen thereon, of a paper table at the introductory side of the platen for supporting and guiding work-sheets to the platen, tally-strip mechanism comprising a supporting frame, a tally-strip supply roll and tally-strip receiving means carried on said frame and so positioned that the tally strip may extend from the supply roll downward in front of the paper table around the platen and upward to said receiving means, the tally strip being spaced from said table to permit the work-sheets to be placed on said table and fed around the platen outside of the tally strip overlying the latter along the printing line, the tally-strip supporting frame being adjustable lengthwise of the platen to bring the tally strip to different positions along the printing line, and means to concomitantly advance the tally strip and overlying work-sheet through different line-space distances.

31. In a typewriting machine, the combination of a revoluble platen, means to control the line-spacing movements of the platen, means to engage the margin of a wide sheet to hold it against said platen to partake of the line-spacing movements thereof, and controlling means connected with said line-spacing means, for effecting, at the operations of said platen, relatively reduced line-space movements of a narrow sheet interposed between the wide sheet and said platen, whereby the interposed sheet advances more slowly than said platen.

32. In a typewriting machine, the combination of a revoluble platen, means to control the line-spacing movements of the platen, means to engage the margin of a wide sheet to hold it against the platen to partake of the line-spacing movements thereof, and controlling means connected with said line-spacing means, for effecting reduced line-space movements of a narrow sheet interposed between the wide sheet and the platen, the means for line-spacing the said narrow sheet including devices adjustable longitudinally of the platen, to permit location of the narrow sheet at a variety of points along the platen.

33. In a typewriting machine, the combination of a revoluble platen, means to control the line-spacing movements of the platen, means to engage the margin of a wide sheet to hold it against the platen to partake of the line-spacing movements thereof, and controlling means connected with said line-spacing means, for effecting reduced line-space movements of a narrow sheet interposed between the wide sheet and the platen, the means for controlling the interposed sheet comprising a device for holding back said interposed sheet against a tendency of the platen to advance the same.

34. In a typewriting machine, the combination of a revoluble platen, means to control the line-spacing movements of the platen, means to engage the margin of a wide sheet to hold it against the platen to partake of the line-spacing movements thereof, and controlling means connected with said line-spacing means, for effecting reduced line-space movements of a narrow sheet interposed between the wide sheet and the platen, the means for controlling the interposed sheet comprising a device for holding back said interposed sheet against a tendency of the platen to advance the same, and being adjustable longitudinally of the platen.

35. In a typewriting machine, the combination of a revoluble platen, means to control the line-spacing movements of said platen, means to engage the margin of a wide sheet to hold it against said platen to partake exactly of the line-spacing movements thereof, and controlling means connected with said line-spacing means, for effecting, at the rotative movements of said platen, relatively reduced line-space movements of a narrow sheet interposed between said wide sheet and the platen, the line-spacing movements of said interposed narrow sheet and of said platen being all controlled by a single manually-operable device.

36. In a typewriting machine, the combination of a revoluble platen, means to control the line-spacing movements of the platen, means to engage the margin of a wide sheet to hold it against the platen to partake of the line-spacing movements thereof, and controlling means connected with said line-spacing means, for effecting reduced line-space movements of a narrow sheet interposed between the wide sheet and the platen, and including a shaft extending along the platen for line-spacing the interposed sheet, and means for enabling said shaft to feed said interposed sheet at various adjustments thereof along the platen.

37. In a typewriting machine, the combination with a revoluble platen, of line-spacing mechanism having only one operating member or driver, said platen controlled by said line-spacing mechanism, means to press an outer or original sheet against said platen to cause said sheet to advance in line-space direction with said platen at the speed thereof, and automatic means connected with said line-spacing mechanism to advance to a less extent a carbon-copy sheet inserted between said outer sheet and the platen; said pressing means being lateral of the inserted sheet, to bear against only portions of the platen that are not occupied by said inserted sheet.

38. In a typewriting machine, the combination with a revoluble platen, of line-spacing mechanism having only one operating member or driver, said platen controlled by said line-spacing mechanism, means to cause an outer or original sheet to be driven by direct contact with said platen by means of rolls pressing the side margins thereof against said platen, and means connected to said line-spacing mechanism to advance to a less extent a sheet inserted between said outer sheet and said platen, and to control said interposed sheet so that said platen may advance independently thereof.

39. In a typewriting machine, the combination with a revoluble platen and a line-spacing mechanism whereby said platen is controlled, of means to hold an outer sheet against the platen, a revoluble device having a connection to said line-spacing mechanism to advance a narrow sheet interposed between the outer sheet and the platen at a less speed than the outer sheet, and means at the introductory side of the platen to hold back the inner sheet against the tendency of the platen to advance the same.

40. In a typewriting machine, the combination with a revoluble platen and a line-spacing mechanism whereby said platen is controlled, of means to hold an outer sheet against the platen, a revoluble device having a connection to said line-spacing mechanism to advance a narrow sheet interposed between the outer sheet and the platen at a less speed than the outer sheet, and means at the introductory side of the platen to hold back the inner sheet against the tendency of the platen to advance the same, said hold-back means including a revoluble member to co-act with the sheet and a friction member to retard its revolution.

41. In a typewriting machine, the combination with a revoluble platen and a line-spacing mechanism whereby said platen is controlled, of means to hold an outer sheet against the platen, a revoluble device having a connection to said line-spacing mechanism to advance a narrow sheet interposed between the outer sheet and the platen at a less speed than the outer sheet, and means at the introductory side of the platen to hold back the inner sheet against the tendency of the platen to advance the same, said hold-back means including a revoluble member to co-act with the sheet and a friction member to retard its revolution, said revoluble device and said hold-back means being adjustable together along the platen.

42. In a typewriting machine, the combination with a revoluble platen, of a line-spacing mechanism therefor, a revoluble device extrajacent to said platen and connected to said line-spacing mechanism to advance a sheet around said platen to a less extent than the movement of said platen, and a pressure device lateral to said sheet, whereby a wider sheet superposed upon said sheet may be line-spaced to the same extent as said platen, said pressure device being mounted to press only upon portions of said platen not occupied by the first-mentioned sheet.

43. In a typewriting machine, the combination with a revoluble platen, of a line-spacing mechanism therefor, a revoluble device extrajacent to the platen and connected to said line-spacing mechanism to advance a sheet around the platen to a less extent than the movement of the platen, and means whereby a sheet superposed upon said sheet may be line-spaced to the same extent as the platen, said revoluble device being adjustable along the platen.

44. In a typewriting machine, the combination of a revoluble platen, a winding spool and a delivery spool both arranged to control a tally strip running directly upon the platen, means for holding upon the platen to turn therewith a sheet superposed upon the tally strip and overlapping the same, a line-spacing mechanism to advance the platen to a greater extent than the tally strip, and means to counteract the tendency of the platen to advance the tally strip unduly.

45. In a typewriting machine, the combination of a revoluble platen, a winding spool and a delivery spool both arranged to control a tally strip running directly upon the platen, means for holding upon the platen to turn therewith a sheet superposed upon the tally strip and overlapping the same, a line-spacing mechanism to advance the platen to a greater extent than the tally strip, and means to counteract the tendency of the platen to advance the tally strip unduly, said tally strip spools being adjustable along the platen.

46. The combination with a revoluble platen, of means mounted extrajacent to said platen for advancing a narrow record sheet around the platen in line-spacing direction, means for giving said platen rotative movements each in excess of the movement of such narrow sheet, and means lateral to said narrow sheet to press a wide sheet against said platen, to be given thereby greater line-spacing movements than those of the narrow sheet, said pressing means mounted to press against only portions of said platen that are not occupied by said narrow sheet.

47. The combination with a revoluble platen, of means mounted extrajacent to the platen for advancing a narrow record sheet around the platen in line-spacing direction, means for giving the platen rotative movements each in excess of the movement of such narrow sheet, means to press a wide sheet against the platen, to be given thereby greater line-spacing movements than those of the narrow sheet, a single line-spacing mechanism being connected both to rotate said platen and advance said narrow sheet, and retarding means being provided for preventing the narrow sheet from advancing as far as the wide sheet at the line-spacing operation of the platen.

48. The combination with a revoluble platen, of means mounted extrajacent to the platen for advancing a narrow record sheet around the platen in line-spacing direction, means for giving the platen rotative movements each in excess of the movement of such narrow sheet, means to press a wide sheet against the platen, to be given thereby greater line-spacing movements than those of the narrow sheet, and means being provided for effecting relative adjustment of the narrow sheet and its feeding means longitudinally of the platen.

49. The combination with a revoluble platen, of means mounted extrajacent to the platen for advancing a narrow record sheet around the platen in line-spacing direction, means for giving the platen rotative movements each in excess of the movement of such narrow sheet, means to press a wide sheet against the platen, to be given thereby greater line-spacing movements than those of the narrow sheet, a single line-spacing mechanism being connected both to rotate said platen and advance said narrow sheet, retarding means being provided for preventing the narrow sheet from advancing as far as the wide sheet at the line-spacing operation of the platen, and means being also provided for silencing the feed of the narrow sheet at the operation of the line-spacing mechanism.

FREDERICK A. HART.

Witnesses:
W. O. WESTPHAL,
JULIUS DUCKSTINE.